United States Patent [19]

Higashitsutsumi

[11] Patent Number: 5,187,582
[45] Date of Patent: Feb. 16, 1993

[54] SOLID-STATE IMAGE PICKUP APPARATUS FOR INSERTING AN IMAGE IN A MAIN SCREEN

[75] Inventor: Yoshihito Higashitsutsumi, Motosu, Japan

[73] Assignee: Sanyo Electric Co., Ltd., Osaka, Japan

[21] Appl. No.: 782,194

[22] Filed: Oct. 24, 1991

[30] Foreign Application Priority Data

Oct. 26, 1990 [JP] Japan ............................ 2-289237

[51] Int. Cl.⁵ .............................................. H04N 5/335
[52] U.S. Cl. ................................ 358/213.11; 358/209; 358/183
[58] Field of Search .............. 358/209, 213.11, 213.26, 358/213.28, 183, 160, 93

[56] References Cited

U.S. PATENT DOCUMENTS

| 4,821,118 | 4/1989 | La Freniere | 358/108 |
| 5,040,068 | 8/1991 | Parulski et al. | 358/209 |
| 5,047,857 | 9/1991 | Duffield et al. | 358/183 |
| 5,047,858 | 9/1991 | Aimonoya | 358/183 |

FOREIGN PATENT DOCUMENTS

| 61-179693 | 8/1986 | Japan . |
| 62-43978 | 2/1987 | Japan . |
| 3-104488 | 5/1991 | Japan . |

Primary Examiner—Michael T. Razavi
Assistant Examiner—Tuan V. Ho
Attorney, Agent, or Firm—Armstrong, Westerman, Hattori, McLeland & Naughton

[57] ABSTRACT

A solid-state image pickup apparatus using a CCD image pickup element for monitoring. This CCD image pickup apparatus is incorporated in a monitor camera so that a plurality monitor images are simultaneously displayed on a single CRT display. To insert a inset screen in a main screen, a format signal conformed with the television system of the main screen is given to video signals of the inset screen. The image pickup apparatus includes a CCD reading timing circuit and a display scanning timing signal generating circuit independent of the CCD reading timing circuit. The display scanning timing signal generating circuit outputs a scanning timing signal coincident with the synchronizing signals of the main screen. A CCD reading signal can be adjusted depending on the position in which the inset screen in the main screen is to be displayed. The display scanning timing signal controls the time start of operation of the CCD reading signal.

9 Claims, 6 Drawing Sheets

SOLID-STATE IMAGE PICKUP APPARATUS FOR INSERTING AN IMAGE IN A MAIN SCREEN

BACKGROUND OF THE INVENTION

1. Field of the Invention

This invention relates to a solid-state image pickup apparatus for displaying video signals in a predetermined region in a main screen of a television system.

2. Description of the Related Art

A monitoring system is currently known in which a plurality of images are displayed on a single display screen using a plurality of television cameras; video signals obtained by the respective television camera are display as controlled to synchronize with one another. This system is useful when used in monitoring, as a single screen pictures of various sections of a building or various segments of a factory.

This kind of monitoring system having a composite screen is exemplified by a coassigned U.S. patent application Ser. No. 630,282 filed Dec. 19, 1990 for SOLID-STATE IMAGE PICKUP APPARATUS and a coassigned U.S. patent application Ser. No. 720,326 filed Jun. 25, 1991 for IMAGE PICKUP APPARATUS FOR SYNTHESIZING IMAGE SIGNALS AND IMAGE SIGNAL PROCESSING SYSTEM.

To obtain the above-mentioned composite screen, the images of the individual television cameras are inserted in the main screen, and a reproduced image from the main screen and video signals from the individual television camera are supplied to a video signal processor where the image and video signals are synthesized as a single synthesized display signal to be displayed on a television monitor.

In one case, the main screen occupies the entire display screen, and in other case, aninset screen is inserted in the main screen of each monitoring television camera, and in still another case, the display screen is equally divided by the video signals from the television cameras independent of the main screen. Further, the number of subdivided screen parts may be set to be two or more, for example, four or nine. With this composite screen, it is possible to simultaneously monitor the steps of production or the like at various sections of a factory.

The individual subdivided video signal can be given with ease from an ordinary television camera. In practice, however, since the display screen is reduced to an x-th size (x stands for an integer), the individual occupied screen region would become smaller, and as a result, image information must be compressed by omitting or overwriting some of the image elements of a standard television system. Accordingly, with regard to the individual inserted image, an image pickup element whose number of image elements is small may be used; a monitoring television camera using a CCD solid-state image pickup element, for example, can perform an adequate function.

However, in order to enable a plurality of video signals to be displayed on a single display screen either if a main screen and an inset screen are allocated to the entire display screen or if a plurality of inset screens are equally allocated to the entire display screen, display synchronizing signals between the individual video signals should have the same timing. For example, when the horizontal and vertical synchronizing signals of the main screen dominate the display screen or when the video signals are inserted in a predetermined region during the horizontal and vertical scanning time, the horizontal and vertical synchronizing signals of the video signals have to be synchronized with those of the main screen.

In the prior art, controlling of the solid-state image pickup apparatus to synchronize with the main screen was accomplished such as by the construction shown in FIG. 5.

In FIG. 5, for picking up a video signal to be inserted in the main screen, a solid-state image pickup apparatus is used, and more particularly a CCD solid-state image pickup element 1 of the frame transfer system is used. The solid-state image pickup element 1 includes an image pickup portion 1I for photoelectrically converting a monitor image into electrical signals, a storage portion 1S for temporarily storing the image signals, and a horizontal transfer portion 1H for sequentially transferring and outputting the stored image information for one line after another. Therefore, electrical charges produced in the image pickup portion 1I by photoelectric conversion are transferred tot he storage portion 1S for storage, whereupon the electrical charge information of the storage portion 1S is outputted from the horizontal transfer portion 1H as an image Y.

In the CCD solid-state image pickup element 1, in order to insert a small inset screen in a main screen, the number of vertical image elements is set to ¼ of the main screen, and the number of image elements of the storage portion 1S is also set to the same number.

To drive the CCD solid-state image pickup element 1, the image pickup apparatus is equipped with a CCD driver circuit 2. The CCD driver circuit 2 includes a vertical transfer clock generating circuit 2V for supplying a vertical transfer clock $\phi_V$ to the image pickup portion 1I, a storage transfer clock generating circuit 2S for supplying a storage transfer clock $\phi_S$ to the storage portion 2S, and a horizontal transfer clock generating circuit 2H for supplying a horizontal transfer clock $\phi_H$ to the horizontal transfer portion 1H. To the vertical and horizontal transfer clock generating circuits 2V, 2S, timing signals from a vertical transfer timing control circuit 3V and a horizontal transfer timing control circuit 3H are respectively supplied so that vertical and horizontal reading operations of the CCD solid-state image pickup element 1 are controlled by these timing signals.

The vertical transfer clock generating circuit 2V transfers, according to a vertical transfer timing signal VT, the electric charges, which are photoelectrically converted in the image pickup portion 1I, to the storage portion 1S in the unit of screen and also transfers, according to a horizontal transfer timing signal HT, the electrical charges, which are stored in the storage portion 1S, to the horizontal transfer portion 1H.

Further, the horizontal transfer clock generating circuit 2H, which is controlled by the horizontal transfer timing signal HT for synchronization, outputs the electrical charges, which are transferred from the storage portion 1S to the horizontal transfer portion 1H, for a period which is ¼ of the horizontal scanning time of the main screen.

With this conventional CCD driver circuit 2, an inset screen whose size is ¼ of the main screen in horizontal and vertical directions can be inserted in the main screen. FIG. 6 schematically shows the inset screen inserted in the main screen; the inset screen provided with hatching is inserted in the main screen at an optical position indicated by solid or dotted lines, the area ratio of the inset screen to the main screen being ¼.

In synthesizing the parent and insect screens, the horizontal and vertical synchronizing signals of the inset screen have to be synchronized with those of the main screen accurately. FIGS. 7A and 7B show this operation timing in the conventional art.

FIG. 7A is a timing diagram of the vertical synchronizing signal, and FIG. 7B is a timing diagram of the horizontal synchronizing signal.

VD and HD designate vertical and horizontal synchronizing signals, respectively, of a main screen. As shown in FIG. 5, the vertical and horizontal transfer timing control circuits 3V, 3H operate according to the vertical and horizontal synchronizing signals Vd, Hd, respectively, of the main screen. As shown in FIG. 6, since an inset screen is to be inserted during the vertical and horizontal scanning time of the main screen, vertical and horizontal reading from the CCD image pickup element 1 to form the inset screen have to be started respectively at the timing delayed by a predetermined time from the main screen.

As shown in FIGS. 7A and 7B, vertical and horizontal transfer timing signals VT, HT are outputted at the timing delayed by a predetermined time from the start-up of the vertical and horizontal synchronizing signals VD, HD. In each of the vertical and horizontal transfer timing control circuits 3V, 3H, the respective output timing of the vertical and horizontal transfer timing signals VT, HT is set with the delay of 0 to V/2 (V stands for a vertical scanning time of the main screen) or 0 to H/2 (H stands for a horizontal scanning time) from the respective synchronizing signals VD, HD of the main screen. Therefore, the position from which displaying of the inset screen in the main screen is to be started can be determined by this delay time.

As indicated by solid lines in FIGS. 7A and 7B, the vertical transfer timing signal VT is set to be displayed by V/3 time from the vertical synchronizing signal VD of the main screen, and the horizontal transfer timing signal HT is set to be delayed by H/2 time from the horizontal synchronizing signal HD of the main screen. At that time, the inset screen to be inserted in the main screen will be displayed, as an image whose area is ¼ of the parent, at a position that is shifted by ⅓ downwardly (in the vertical direction) and by ⅛ rightwardly (in the horizontal direction).

As indicated by dotted lines in FIGS. 7A and 7B, when the vertical transfer timing signal VT and the horizontal transfer timing signal HT are set to be delayed by V/2 and H/3, respectively, each transfer timing of the CCD image pickup element 1 is changed so that, as indicated by dotted lines in FIG. 6, the image I of the inset screen will be inserted at a position that is displaced downwardly (in the vertical direction) by ½ and rightwardly (in the horizontal direction) by ⅓.

Therefore, by setting a delay time of the vertical transfer timing signal VE to an optional value, the vertical position of the inset screen to be inserted in the main screen is determined. Likewise, by setting a delay time of the horizontal transfer timing signal HT to an optional value, the horizontal position of the inset screen to be inserted in the main screen is determined.

The size of the inset screen shown in FIGS. 5, 6 and 7 has a ½ length either in the vertical direction or in the horizontal direction, compared to the main screen. As a result, it is preferable to set the vertical and horizontal transfer timing signals VT, HT to be delayed by at most V/2 and H2 from the vertical and horizontal synchronizing signals VD, HD, respectively, of the main screen so that the inset screen will not separated vertically or horizontally in the main screen.

Therefore, a video signal Y of the inset screen has a vertical and a horizontal video time which is ½ of the respective scanning time v, 1H of the main screen as shown in FIGS. 7A and 7B, and so this video signal Y is displayed as an image having an area reduced by ½ of the main screen either vertically or horizontally. Of course, for outside the display region, vertical and horizontal blanking signals VBL, HBL are added to the video signal Y, which is from the CCD image pickup element 1, except the video time region of the inset screen, so that any noise is prevented without fail from being mixed in the video signal of the main screen.

Though there is no detailed illustration, the video signal Y of this inset screen is synthesized with the video signal of the main screen by a video signal processor, and the resulting composite signal is supplied to a television monitor.

Thus, when reading the video signal of the inset screen from the CCD solid-state image pickup apparatus, each of vertical and horizontal transfer timing signals from the CCD image pickup element 1 is determined to be delayed by a predetermined time from the blanking signal of the respective synchronization signal VD, HD of the main screen. At that time, the CCD driver circuit not only should control these transfer timing signals VT, HT but also should process the video signal Y of the inset screen in conformity with the television formatting system of the screen. Various kinds formatting signals needed for this signal processing are horizontal and vertical synchronizing signals, for example, included in the video signal Y of the inset screen. Each of these vertical and horizontal synchronizing signals also should be set to be delayed by a predetermined time from the blanking signal of the respective synchronizing signal VD, HD of the main screen, thus synchronizing the synchronizing signals of the main screen correctly.

Consequently, each time when the display position of the inset screen in the main screen is changed, the operation mode of the synchronizing signal generating circuit should be changed in synchronism with the main screen, thereby making the CCD driver circuit complex. More particularly, in a monitor camera, which should be small-sized using a CCD solid-state image pickup apparatus and in which scanning should be simplified, the CCD driver circuit would be complex, thus requiring much more wiring for each circuit. As a result, the monitor camera would be large-sized.

SUMMARY OF THE INVENTION

It is therefore an object of this invention to provide a solid-state image pickup apparatus in which a read out timing for inserting the image of an inset screen in a main screen at a predetermined region can be optionally set and which can be simplified in construction and can be small-sized even as a monitor camera.

Another object of the invention is to provide a solid-state image pickup apparatus which is simple in construction and small in size and in which a read out timing of an inset screen can be optionally set and the inset screen can be adjustably inserted in a main screen without any constraint.

According to the invention, there is provided a solid-state image pickup apparatus for inserting a predetermined image in a part of a main screen, comprising: a solid-state image pickup element for photoelectrically converting a received image and generating a sequence of electric charges including information according to a video pattern; a drive means for transferring the electric charges vertically and outputting the vertically transferred electric charges for every horizontal line to obtain a desired video signal for the inserted (inset) image; scanning timing setting means for setting a read out timing and a display scanning timing of the solid-state image pickup element according to the television system of a main screen; and the scanning timing setting means including a display scanning signal generating circuit for generating a synchronizing signal in accordance with the television system of the main screen and fixedly setting the format of the video signal in conformity with the main screen and a read out timing signal generating circuit for generating a read operating timing of the drive means, whereby the reading timing of the solid-state image pickup element can be adjusted based on the display scanning timing signal.

With this arrangement, since the display scanning timing signal generating circuit and the reading timing signal generating circuit are separate from each other, it is possible to fixedly synchronize the display scanning timing with the scanning signal of the main screen. By changing only the reading timing, the position in which the inset screen is to be inserted in the main screen can be changed optionally.

DETAILED DESCRIPTION

Figure 1:
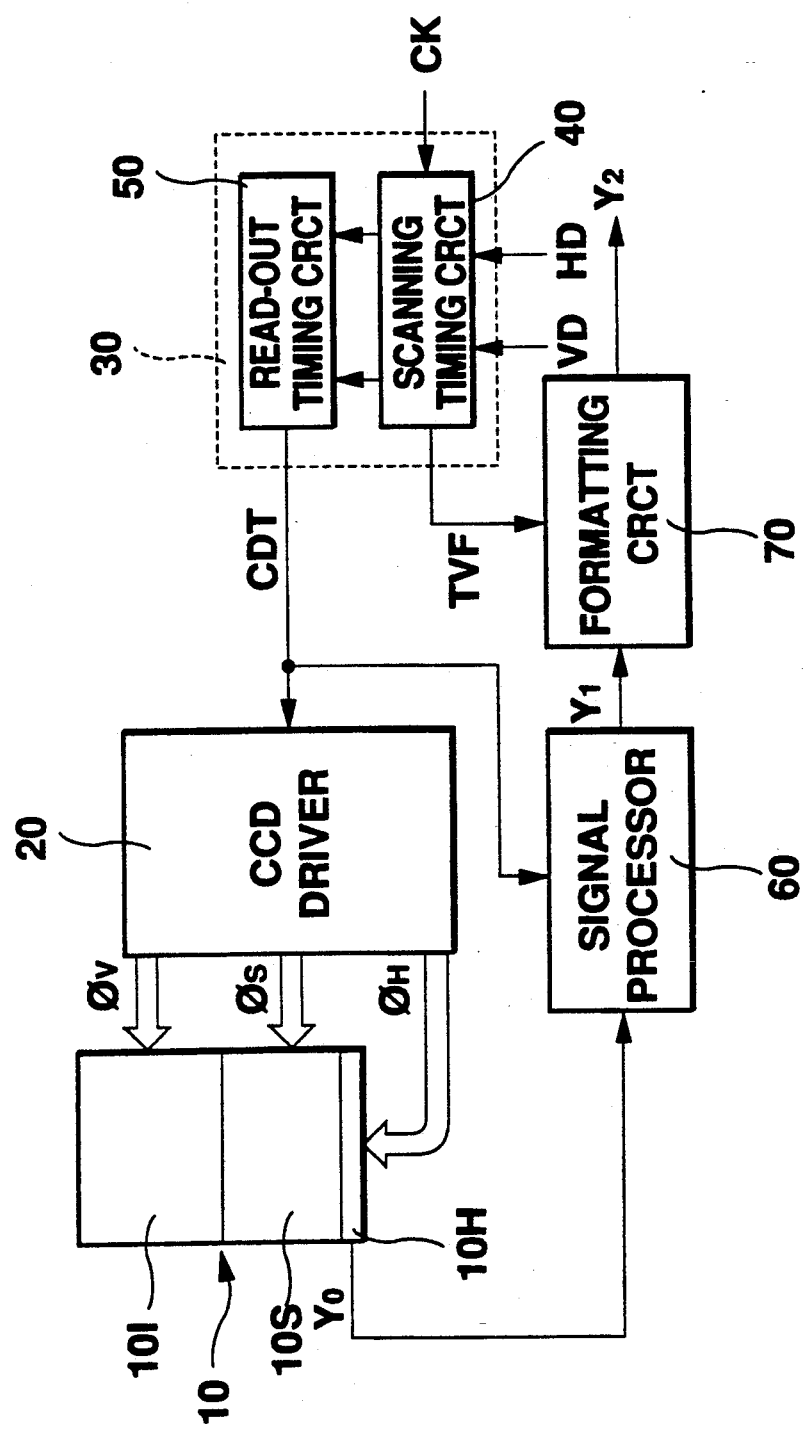
FIG. 1 is a block diagram showing the circuit structure of a solid-state image pickup apparatus according to one embodiment of this invention.
Figure 5:
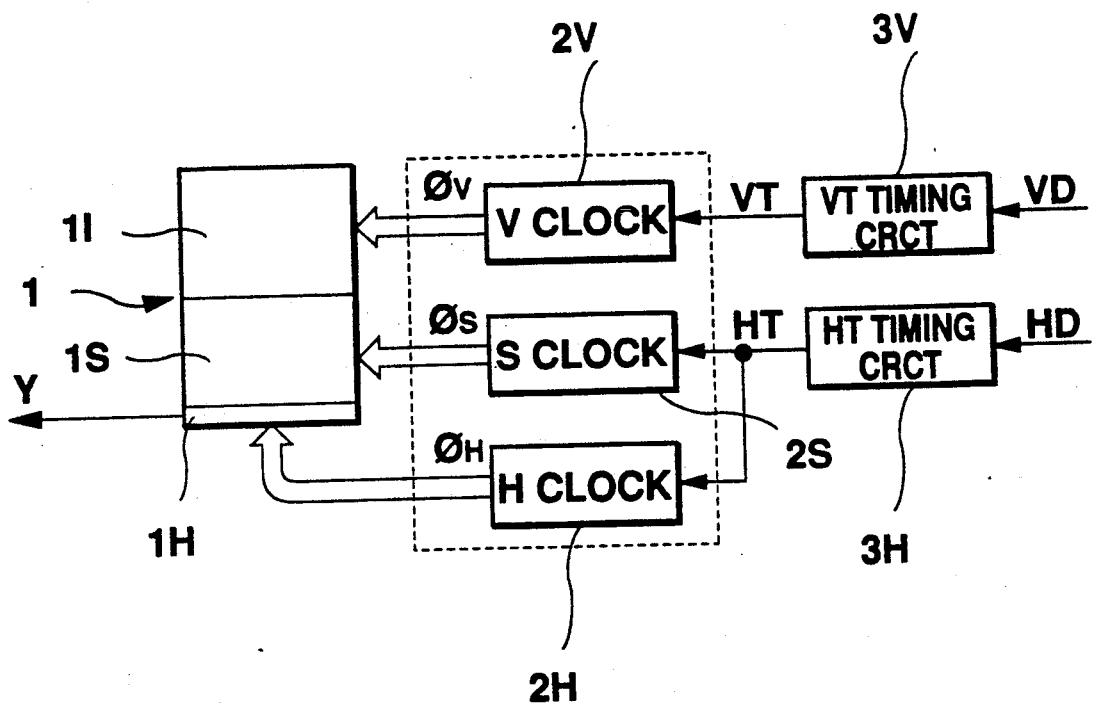
FIG. 5 is a block diagram showing a prior art circuit for outputting video signals of an inset screen, the circuit using a conventional CCD solid-state image pickup element.

The principles of this invention are particularly useful when embodied in a CCD solid-state image pickup apparatus such as shown in FIG. 1. The CCD solid-state image pickup apparatus uses a CCD solid-state image pickup element 10 which is similar in construction to the conventional image pickup element of FIG. 5.

As shown in FIG. 1, the CCD solid-state image pickup element 10 of the frame transfer system includes an image pickup portion 10I for photoelectrically transducing a received image and generating a signal having an electrical charge amount corresponding to an image pattern, a storage portion 10S for storing the electrical charge of this image information transferred from the image pickup portion 10I, and a horizontal transfer portion 10H for outputting the stored electrical charge as a video signal $Y_0$.

In the CCD solid-state image pickup element 10, in order to output a video signal having a display area smaller than that of a main screen, the number of vertical and horizontal image elements of the inset screen is set to an x-th (x stands for an integer, e.g., 2, 3 or 4) of the number of image elements of the main screen.

The CCD image pickup element 10 is equipped with a CCD driver circuit 20 which includes a plurality of clock circuits for supplying a vertical transfer clock $\phi V$, a storage transfer clock $\phi S$ and a horizontal transfer clock $\phi H$ respectively to the image pickup portion 10I, the storage portion 10S and the horizontal transfer portion 10H. Therefore, in the CCd image pickup element 10, horizontal and vertical reading is controlled by the respective clock signals from the CCD driver circuit 20.

The driving timing of the CCD driver circuit 20 is performed by a timing signal CDT which is supplied from a timing control circuit 30.

As a significant feature of this invention, the timing control circuit 30 is composed of two separate circuits, i.e. a display scanning timing signal generating circuit 40 for generating a display scanning timing signal or a formatting signal TVF to synchronize the video signal of a inset screen with the format matching with the television system of a main screen, and a read out timing signal generating circuit 50 for generating a read out timing signal CDT to determine a read out timing of the CCD driver circuit 20.

The timing control circuit 30 outputs a display scanning timing signal TVF and a read out timing signal CDT from the respective timing circuits 40, 50 upon receipt of a clock CK having a predetermined period equal to the basic clock of the main screen and also upon receipt of vertical and horizontal synchronizing signals VD, HD of the main screen. The reading timing signal generating circuit 50 is activated by a trigger signal from the display scanning timing signal generating circuit 40 so that the position in which the inset screen is to be inserted in the main screen can be adjusted by delaying the reading timing signal CDT by a predetermined time from the synchronizing signal of the main screen. Thus it is possible to insert a inset screen in a predetermined region during the vertical and horizontal periods of the main screen.

The reading timing signal CDT is supplied to the CCD driver circuit 20 and also to a signal processing circuit 60 for processing a video signal $Y_0$, which is to be read from the CCD image pickup element 10, such as by sampling and blanking. Therefore, the signal processing circuit 60 operates in synchronism with the drive reading timing of the CCD driver circuit 10 and processes the video signal $Y_0$ with a predetermined process and then supplies the thus processed video signal $Y_1$ to a formatting circuit 70 in the subsequent stage.

The formatting circuit 70 superposes the vertical and horizontal synchronizing signals, which are synchronized with the main screen as format synchronizing signals, over the processed video signal $Y_1$ supplied from the signal processing circuit 60, and then the formatting circuit 70 outputs a video signal $Y_2$ matching with the television system of the main screen. The display scanning timing signal TVF is supplied to the formatting circuit 70; in this invention, the read video signal of the main screen is formatted into a format matching with the television system by this formatting signal TVF.

The video signal $Y_2$, as described at the "Description of the Related Art", is synthesized with a video signal of the main screen in a video signal processor, and the resulting signal is displayed by a television monitor.

Figure 2:
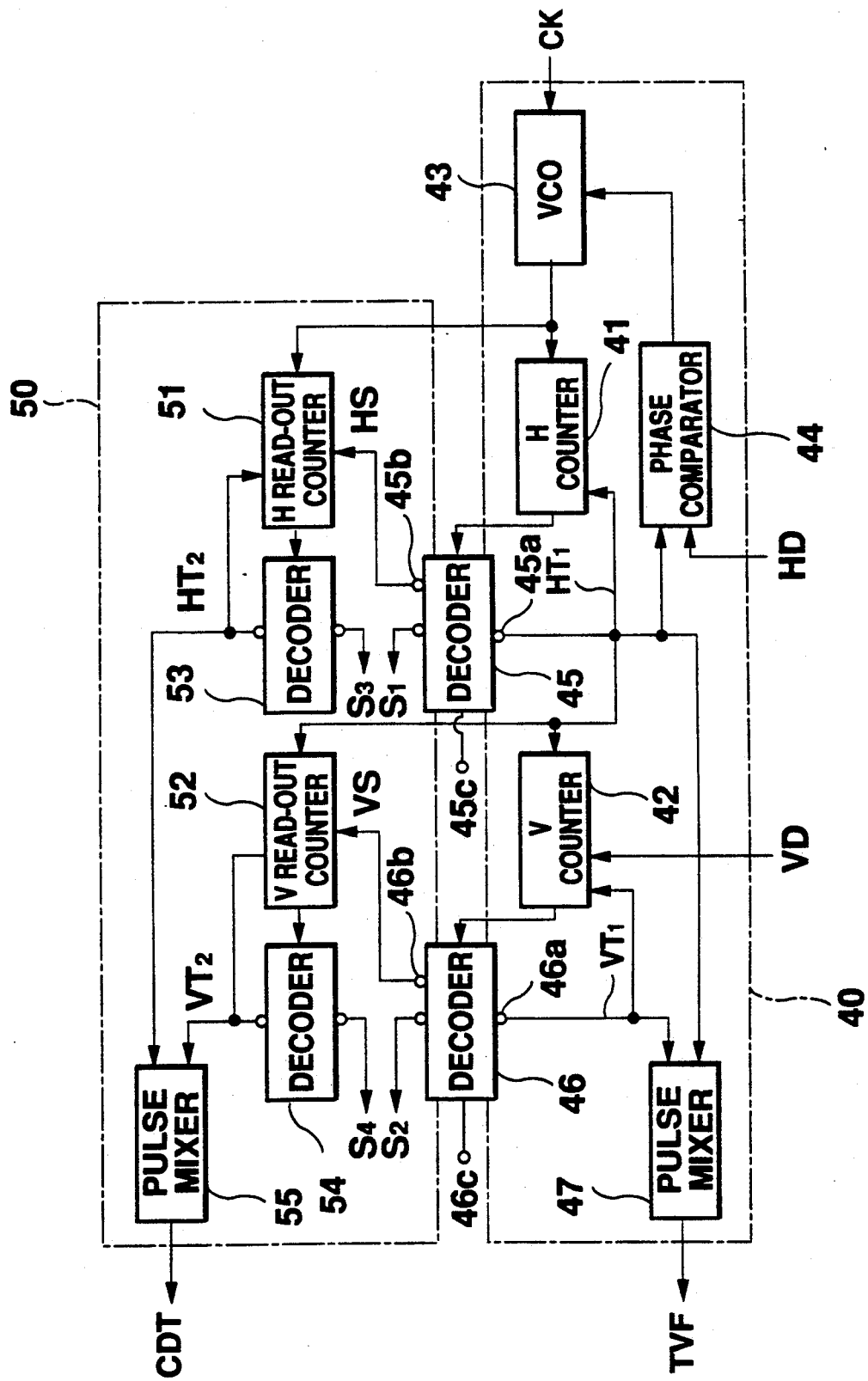
FIG. 2 is a block diagram showing a CCD driver circuit shown in FIG. 1.
Figure 3A:
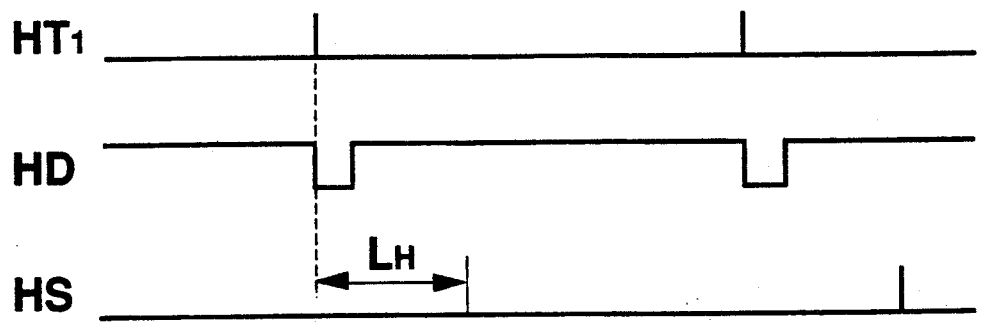
FIGS. 3A and 3B are timing diagrams showing the operation of the CCD driver circuit of FIG. 2.
Figure 3B:
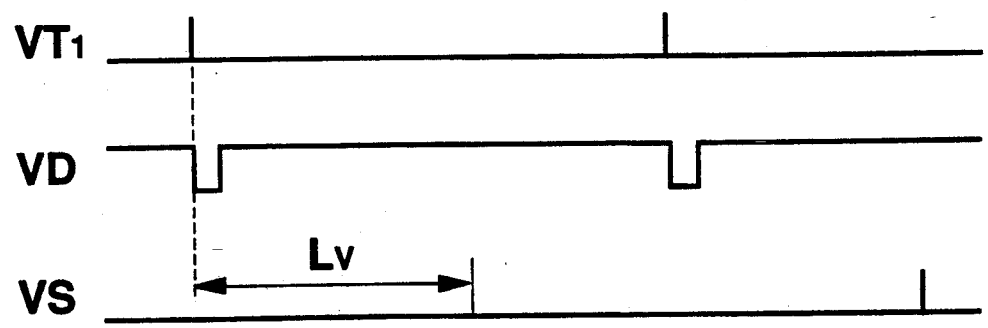

FIG. 2 shows the detailed structure of the timing control circuit 30, and the timing of the individual portion of this circuit is shown in FIGS. 3A and 3B as the horizontal and vertical scanning signals, respectively.

The display scanning timing signal generating circuit 40 includes vertical and horizontal synchronous counters 41, 42 for outputting vertical and horizontal scanning timing signals of the inset screen in synchronism with the vertical and horizontal synchronizing signals VD, HD of the main screen. The horizontal synchronous counter 41 forms a phase-locked loop circuit (PLL) jointly with a voltage-controlled oscillator (VCO) 43 and a phase comparator circuit 44. Therefore, with the horizontal synchronizing signal HD separated and obtained, as a reference signal, from the video signal from the main screen, the output of the horizontal synchronous counter 41 is synchronized with the video signal of the main screen. The output of the horizontal continuous counter 41 is supplied to a decoder 45, and from a first output terminal 45a of this decoder 45, the horizontal synchronizing signal $HT_1$ of the insert screen is outputted. The vertical synchronous counter 42 receives the horizontal synchronizing signal of the decoder 45 and is then reset by the vertical synchronizing signal VD separated from the video signal of the main screen, so that the vertical scanning timing of the inset screen can be synchronized with the main screen. Further, the output of the vertical continuous counter 42 is supplied to another decoder 46, and from a first output terminal 46a of this decoder 46, the vertical synchronizing signal $VT_1$ of the inset screen is outputted.

The outputs of these decoders 45, 46 are supplied, as the horizontal synchronizing signal $HT_1$ and the vertical synchronizing signal $VT_1$, to a pulse synthesizing circuit 47 where these synchronizing signals are synthesized as a display scanning timing signal or a formatting signal TVF.

As mentioned above, the horizontal continuous counter 41 is controlled to be synchronized with the horizontal synchronizing signal HD of the main screen. In the decoder 45, the horizontal synchronizing timing signal $HT_1$ is converted and is then outputted. Meanwhile, the vertical continuous counter 42 is reset by the vertical synchronizing signal VD of the main screen. In the decoder 46, the vertical synchronizing signal $VT_1$ matching with the television scanning system of the main screen is converted and is then outputted.

In this invention, the display scanning timing signal generating circuit 40 is used to obtain a formatting signal TVF matching with the television scanning system of the main screen. If the television system of the main screen is determined, a formatting signal TVF will be determined.

However, the position in which the inset screen is to be inserted in the main screen can be adjusted so that the start position of insertion of the inset screen is determined by the horizontal and vertical reading control pulses HS, VS outputted from the second output terminals 45b, 46b of the decoders 45, 46.

These decoders 45, 46 thus form a delay circuit. By adjusting the delay amount of these decoders 45, 46, necessary delay time is given, as the reading control pulses HS, VS, to the horizontal and vertical synchronous signals, and these delayed signals are outputted to the respective counters 51, 52 of a read out timing signal outputting circuit 50. Therefore in the illustrated example, the start of operation of the horizontal and vertical reading timing signals will be set respectively during the horizontal and vertical scanning periods.

The set values of the decoders 45, 46 can be adjusted optionally, and for example, by adjusting a digital switch, these delay amounts can be determined to desired values according to the instruction values from the input terminal 45c, 46c of the decoders 45, 46.

Figure 6:
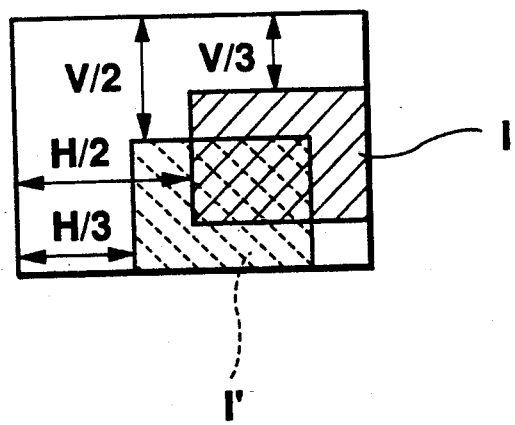
FIG. 6 shows the manner in which generally an inset screen is inserted in a main screen.
Figure 7A:
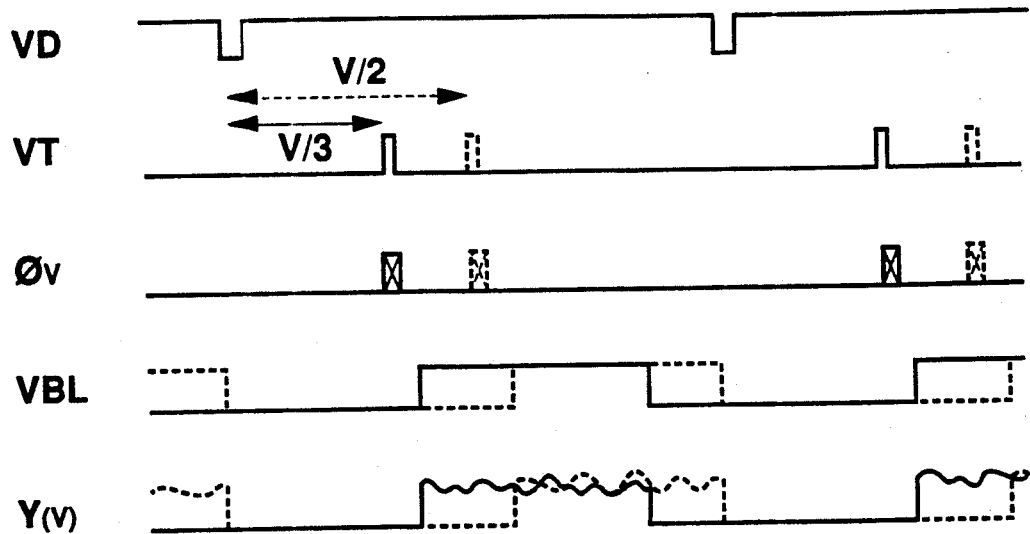
FIGS. 7A and 7B are timing diagrams of synchronizing signals of the parent and inset screens in the prior art.
Figure 7B:
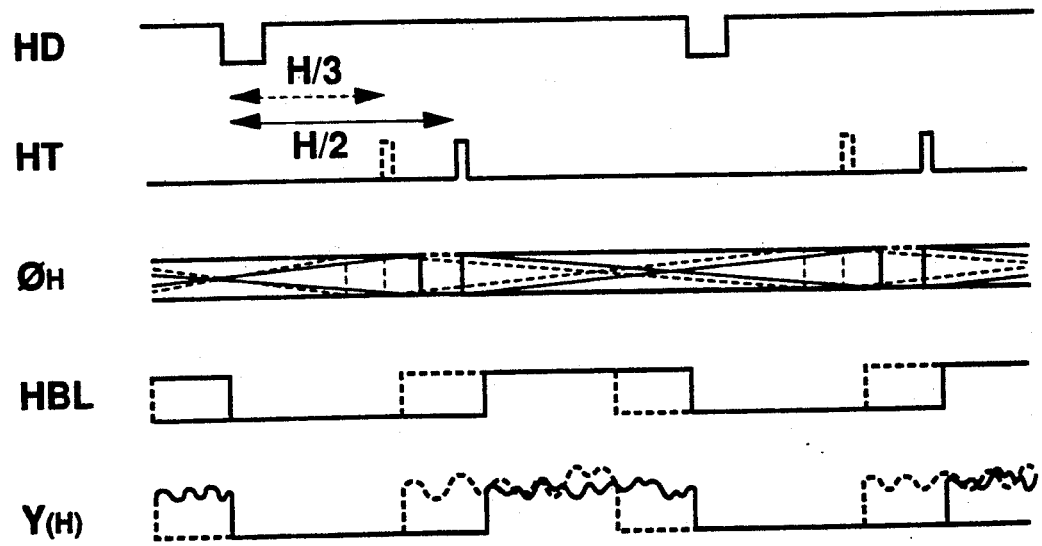

The reading timing signal generating circuit 50 includes horizontal and vertical reading counter 51, 52 for controlling horizontal and vertical reading of the CCD image pickup element 10; the start of operation of the horizontal and vertical reading counters 51, 52 is controlled by the horizontal and vertical reading control pulses HS, VS outputted from the respective display scanning timing signal generating circuit 40. Therefore, as shown in FIGS. 3A and 3B, the operation of the horizontal and vertical reading counters 51, 52 of the reading timing signal generating circuit 50 is started from the position delayed by a predetermined amount, i.e. $L_H$ horizontally and $L_V$ vertically in this embodiment, from the horizontal and vertical blanking positions of the main screen by the horizontal and vertical reading control pulses HS, VS. In the inset screen I in FIG. 6, the delay amount $L_H$ is H/2 and the delay amount $L_V$ is V/3, thereby determining the position in which the inset screen is to be displayed in the main screen.

In FIG. 2, the reading timing signal generating circuit 50 is equipped with decoders 53, 54 for decoding the outputs of the horizontal and vertical reading counters 51, 52. These decoders 53, 54 monitor the respective count values of the horizontal and vertical reading counters 51, 52 and supply reset signals to the respective counters 51, 52 when the count values reach predetermined values, i.e. the horizontal and vertical scanning time in the usual case. Therefore, the outputs of these decoders 53, 54 are supplied, as horizontal and vertical reading signals $HT_2$, $VT_2$, to a pulse synthesizing circuit 55. For example, in this embodiment, the reading time of the CCD image pickup element 10 according to these reading signals $HT_2$, $VT_2$ are set to ½ of the horizontal and vertical scanning time H, V of the main screen, thereby controlling the reading timing of the CCD image pickup element 10.

Change-over signals $S_1$, $S_2$, $S_3$, $S_4$ to be outputted from the respective decoders 45, 46, 53, 54 are used as display change-over timing signals for switching between the inset and main screens.

As mentioned above, the reading timing signal generating circuit 50 operates with a delay, i.e. $L_H$ horizontally and $L_V$ vertically with respect to the display scanning timing signal generating circuit 40. As a result, the reading timing signal generating circuit 50 drives the CCD image pickup element 10 as delayed by $L_H$ and $L_V$ at the horizontal and vertical scanning timings, respectively, with respect to the formatting signal TVF for formatting the video signal of the inset screen. Thus the video signal of the inset screen has been inserted in the main screen at an optional position during the horizontal and vertical scanning time, causing a desired screen synthesis.

According to this invention, since the display scanning timing is separated from the reading timing of the CCD image pickup element, it is possible to fixedly determine the display scanning timing to match with the main screen. On the other hand, the reading timing of the CCD image pickup element is adjustable as desired so that the position in which the inset screen is to be displayed in the main screen can be varied with ease.

Thus since a desired position of insertion is determined by adjusting only the reading timing of the CCD image pickup element, it is possible to simplify the timing generating circuits.

Figure 4:
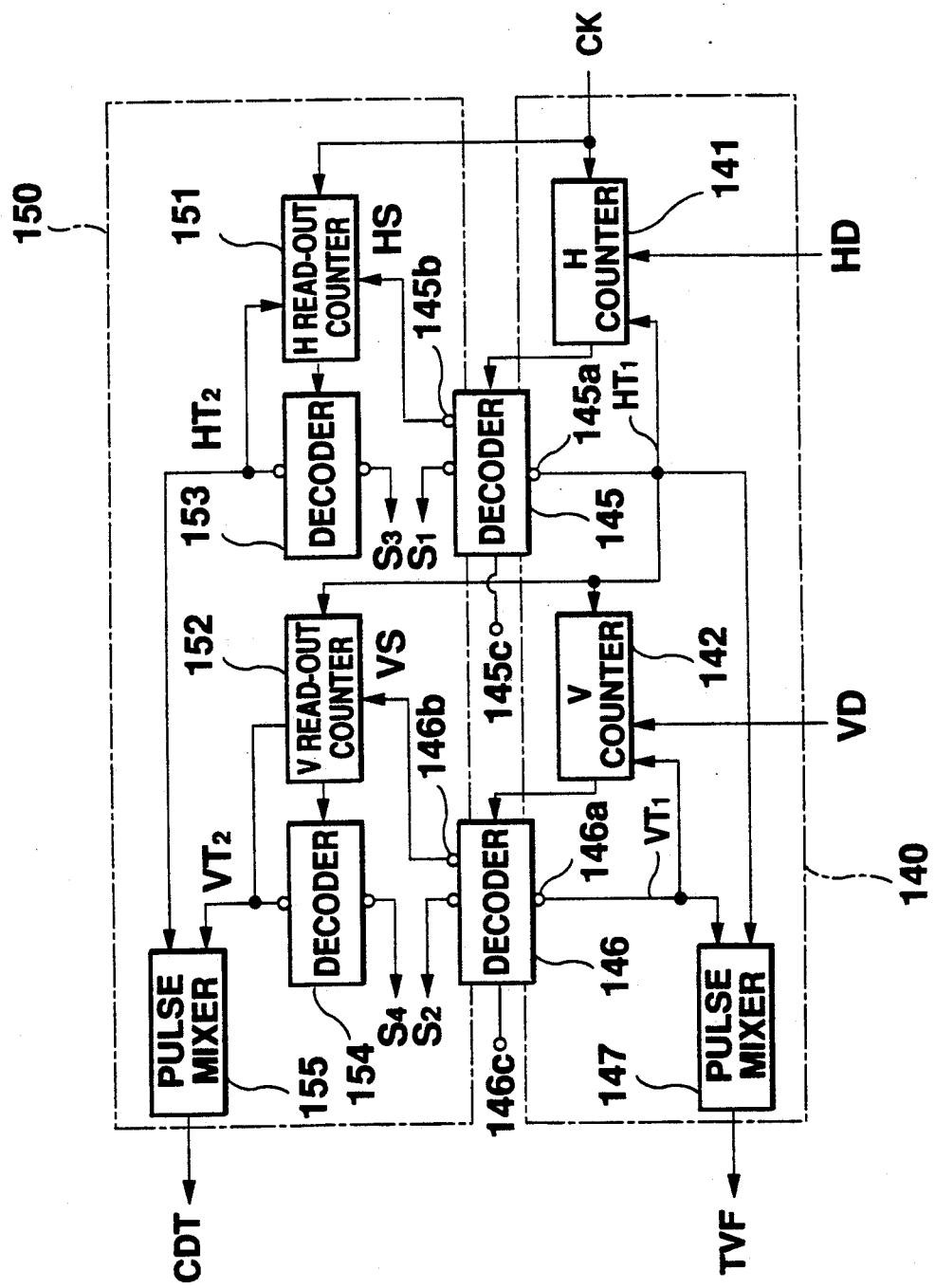
FIG. 4 is a block diagram similar to FIG. 2, showing a modified CCD driver circuit.

FIG. 4 shows a modified solid-state image pickup apparatus according to a second embodiment. In FIG. 4, parts or elements similar to those of FIG. 2 are designated by adding 100 to each of reference numerals of FIG. 2.

In this embodiment, the synchronizing circuit of a display scanning timing signal generating circuit 140 is different from that of FIG. 2; it is a so-called direct reset type in which a horizontal synchronous counter 141 is reset directly by the horizontal synchronizing signal HD of the main screen. In this arrangement, like the embodiment of FIG. 2, it is possible to perfectly synchronize the formatting signal TVF from the display scanning timing signal generating circuit 140 with the scanning signal of the main screen.

According to this invention, since the display scanning timing generating circuit is separated from the reading timing signal generating circuit of the image pickup element, it is possible to fixedly set the display scanning timing in conformity with the television system of a main screen, and it is possible to change the reading timing of the image pickup element. This circuit separation makes the circuit structure simple, guaranteeing a low-cost and light-weight image pickup apparatus.

In the illustrated embodiments, the solid-state image pickup element is of the frame transfer system. Alternatively, it may be of an interline transfer system or frame-interline transfer system.

What is claimed is:

1. A solid-state image pickup apparatus for inserting a predetermined image in a part of a main screen, comprising:
   (a) a solid-state image pickup element for photoelectrically converting a received image and generating a sequential of electric charges including information according to a video pattern;
   (b) a drive means for transferring the electric charges vertically and outputting the vertically transferred electric charges for every horizontal line to obtain a desired inset video signal;
   (c) scanning timing setting means for setting a read out timing and a display scanning timing of said solid-state image pickup element according to the television system of a main screen; and
   (d) said scanning timing setting means including a display scanning signal generating circuit for generating a synchronizing signal in accordance with the television system of the main screen and fixedly setting the format of the video signal in conformity with the main screen and a read out timing signal generating circuit for generating a read operating timing of said drive means, whereby the read operating timing of said solid-state image pickup element can be adjusted based on said display scanning timing signal; wherein said display scanning timing signal generating circuit includes a horizontal synchronous counter to be controlled to synchronize with a horizontal synchronizing signal of the main screen and a vertical synchronous counter to be controlled to synchronize with a vertical synchronizing signal of the main screen.

2. A solid-state image pickup apparatus for inserting a predetermined image in a part of a main screen, comprising:
   (a) a solid-state image pickup element for photoelectrically converting a received image and generating a sequential of electric charges including information according to a video pattern;
   (b) a drive means for transferring the electric charges vertically and outputting the vertically transferred electric charges for every horizontal line to obtain a desired inset video signal;
   (c) scanning timing setting means for setting a read out timing and a display scanning timing of said solid-state image pickup element according to the television system of a main screen; and
   (d) said scanning timing setting means including a display scanning signal generating circuit for generating a synchronizing signal in accordance with the television system of the main screen and fixedly setting the format of the video signal in conformity with the main screen and a read out timing signal generating circuit for generating a read operating timing of said drive means, whereby the read operating timing of said solid-state image pickup element can be adjusted based on said display scanning timing signal;
   wherein said display scanning timing signal generating circuit includes a horizontal synchronous counter to be controlled to synchronize with a horizontal synchronizing signal of the main screen a vertical synchronous counter to be controlled to synchronize with a vertical synchronizing signal of the main screen, a horizontal delay decoder for delaying the output of said horizontal synchronous counter by a delay amount to determine the position from which display of the inset screen in the main screen is to be started, and a vertical delay decoder for delaying the output of said vertical synchronous counter by a delay amount to determine the position from which display of the inset screen in the main screen is to be started, and
   wherein said read out timing signal generating circuit includes another horizontal synchronous counter corresponding to the first-named horizontal synchronous counter for the display scanning timing signal, another vertical synchronous counter corresponding to the first-named vertical synchronous counter for the display scanning timing signal, a horizontal read decoder for outputting the output of the last-named horizontal synchronous counter by the period during which the inset screen is to be displayed, and a vertical read decoder for outputting the output of the last-named vertical synchronous counter by the period during which the inset screen is to be displayed.

3. A solid-state image pickup apparatus according to claim 2, wherein each of said horizontal and vertical read decoders for determining the position in which the inset screen is to be inserted is a delay circuit in which a delay amount can be set from outside.

4. A solid-state image pickup apparatus according to claim 2, wherein said display scanning timing signal generating circuit is a phase-locked loop circuit to be synchronized with the synchronizing signals of the main screen.

5. A solid-state image pickup apparatus according to claim 2, wherein said display scanning timing signal generating circuit is a direct reset circuit to be synchronized with the synchronizing signals of the main screen.

6. A solid-state image pickup apparatus for inserting a predetermined image as an inset screen in a part of a main screen, comprising;
   (a) a solid-state image pickup element for photoelectrically converting a received image and producing an output video signal by sequentially generating electric charges representing a video image to be displayed in the inset screen, said solid-state image pickup element having a read operating timing which is controllable in response to a driver input signal;
   (b) a driver means supplying said driver input signal for driving said solid-state image pickup element to control said read operating timing, causing transfer of the electric charges from said solid-state image pickup element and causing output of the transferred electric charges for every horizontal line of the video image to produce an inset video signal;
   (c) a scanning timing signal generating circuit receiving a clock signal and vertical and horizontal synchronizing signals from a television system of the main screen, for producing a trigger signal and a formatting signal to synchronize the video signal of the inset screen with a format matching with the television system of the main screen; said scanning timing signal generating circuit comprising a horizontal synchronous counter receiving said horizontal synchronizing signals and said clock signal, for producing a horizontal scanning timing signal;
   (d) a read out timing signal generating circuit receiving said trigger signal from said scanning timing signal generating circuit, for outputting a read out timing signal, said read out timing signal being supplied to said driver means to determine a read out timing of said driver means;
   (e) a signal processing circuit receiving said read out timing signal from said read out timing signal generating circuit and said output video signal from said solid-state image pickup element, for producing a first processed video signal; and
   (f) a formatting circuit receiving said formatting signal and said first processed video signal, for producing a second output video signal matching the television system of said main screen by superposing said vertical and horizontal synchronizing signals over said first processed video signal.

7. A solid-state image pickup apparatus as claimed in claim 6, wherein said scanning timing signal generating circuit comprises a vertical synchronous counter and a first decoder for producing a vertical synchronizing signal of said inset screen from the output of said vertical synchronous counter.

8. A solid-state image pickup apparatus as claimed in claim 7, wherein said scanning timing signal generating circuit comprises a second decoder for producing a horizontal synchronizing signal of said inset screen from the output of said horizontal synchronous counter.

9. A solid-state image pickup apparatus as claimed in claim 8, wherein said scanning timing signal generating circuit comprises a pulse mixer receiving said horizontal synchronizing signal and said vertical synchronizing signal, and outputting said formatting signal.

* * * * *